(12) United States Patent
Dutton

(10) Patent No.: US 7,419,199 B2
(45) Date of Patent: Sep. 2, 2008

(54) EXTERIOR REARVIEW MIRROR WITH TURN SIGNAL

(75) Inventor: Christopher M. Dutton, Goshen, IN (US)

(73) Assignee: Hadley Products, Grandville, MI (US)

( * ) Notice: Subject to any disclaimer, the term of this patent is extended or adjusted under 35 U.S.C. 154(b) by 313 days.

(21) Appl. No.: 11/426,034

(22) Filed: Jun. 23, 2006

(65) Prior Publication Data

US 2008/0036230 A1    Feb. 14, 2008

(51) Int. Cl.
    *B62D 39/00*    (2006.01)
(52) U.S. Cl. .................. 296/1.11; 362/494; 362/540; 362/545
(58) Field of Classification Search ............... 296/1.11; 362/494, 540, 545, 548
    See application file for complete search history.

(56) References Cited

U.S. PATENT DOCUMENTS

| 2,600,751 | A | 6/1952 | Gazda |
|---|---|---|---|
| 5,371,659 | A | 12/1994 | Pastrick et al. |
| 5,402,103 | A | 3/1995 | Tashiro |
| 5,497,305 | A | 3/1996 | Pastrick et al. |
| 5,669,705 | A | 9/1997 | Pastrick et al. |
| D427,128 | S | 6/2000 | Mathieu |
| 6,280,069 | B1 | 8/2001 | Pastrick et al. |
| 6,677,856 | B2 | 1/2004 | Perlman et al. |
| D505,369 | S | 5/2005 | Huang |
| 6,970,074 | B2 | 11/2005 | Perlman |
| 7,325,953 | B2 * | 2/2008 | Pastrick ................ 362/511 |
| 2002/0001196 | A1 | 1/2002 | Pastrick et al. |
| 2002/0021571 | A1 * | 2/2002 | Pastrick et al. .......... 362/494 |
| 2002/0126497 | A1 * | 9/2002 | Pastrick ................. 362/494 |
| 2003/0179087 | A1 | 9/2003 | Stahel |
| 2004/0170025 | A1 * | 9/2004 | Pastrick et al. .......... 362/494 |
| 2004/0212489 | A1 * | 10/2004 | Chan ..................... 340/475 |
| 2005/0047158 | A1 | 3/2005 | Koehler |
| 2005/0110630 | A1 * | 5/2005 | Pastrick ................. 340/475 |
| 2005/0190465 | A1 | 9/2005 | Henion et al. |
| 2005/0243449 | A1 * | 11/2005 | Pavao ................... 359/877 |
| 2005/0276058 | A1 | 12/2005 | Romas et al. |
| 2005/0281043 | A1 | 12/2005 | Eisenbraun |
| 2007/0058257 | A1 * | 3/2007 | Lynam .................. 359/604 |

\* cited by examiner

*Primary Examiner*—Lori L Lyjak
(74) *Attorney, Agent, or Firm*—Warner Norcross & Judd LLP

(57) ABSTRACT

A signal mirror assembly including a convex mirror and a signal indicator. The convex mirror defines a recess or cutout region. The signal indicator fits within the cutout region. The assembly can include a housing, and the convex mirror can include a perimeter extending substantially to the housing, except where the cutout region exists. A gasket can circumferentiate the housing, the mirror and a portion of the signal indicator to prevent water and debris from entering the assembly. The signal indicator also can include a surface parallel to the convex mirror surface. The cut out region and the corresponding signal indicator can be positioned in the housing such that the signal indicator is located at a position distal from the vehicle to enhance its visibility to the vehicle operator.

20 Claims, 9 Drawing Sheets

EXTERIOR REARVIEW MIRROR WITH TURN SIGNAL

BACKGROUND OF THE INVENTION

The present invention relates to, exterior rearview mirrors for vehicles, and more particularly to a mirror including-a signal indicator.

Vehicle manufacturers conventionally located turn signals at the corners of vehicles to improve visibility of those signals when activated to signal a lane change or vehicle turning. Recently, manufacturers have began to include both torn signal and flat, mirrors in exterior rearview mirror assemblies to further improve signal visibility. Such signal mirror assemblies are particularly advantageous where a following vehicle is close, or where the equipped vehicle is a long truck or is towing a trailer.

Although recent signal mirror assemblies are useful, they suffer several shortcomings. For example, to accommodate both a sufficiently-sized flat mirror and a separate signal, the housing for the signal mirror assembly usually must be increased in size. In turn, the driver of the vehicle must take additional care to avoid colliding the larger mirror assembly with objects. Alternatively, the flat mirror of the signal mirror assembly must include a special coating that allows signal lights positioned behind the flat mirror surface to be seen through that surface* This special coating requires additional manufacturing techniques and extra labor to ensure that the signal lights align with the coating. In addition, the recent signal mirror assemblies include flat mirrors, and thus only provide limited rear viewing capabilities.

SUMMARY OF THE INVENTION

The aforementioned problems are overcome by a signal mirror assembly including a convex mirror, which provides wide angle viewing capabilities, and a signal indicator. The convex mirror defines a recess or cutout region. The signal indicator is fit within the cutout region.

Optionally, the signal mirror assembly can include a housing, and the convex mirror can extend substantially to the housing, except where the cutout region exists. The signal indicator also can include a surface that is substantially parallel to the convex mirror surface and can be further shaped to substantially conform to the recess or cutout. Further optionally, the assembly can include a gasket which substantially surrounds a portion of the housing, a perimeter of the mirror, and a portion of the signal indicator to prevent or inhibit, moisture and debris from entering the assembly. In addition, the cut out region and the corresponding signal indicator can be positioned in the housing such that the signal indicator is located at a position away from the vehicle to enhance its visibility to the vehicle operator.

The signal mirror assembly of the present invention provides a simple and efficient construction including a convex mirror that provides wide angle viewing and a turn signal. With the signal located substantially in a cutout region of the mirror, the total space required for both components is reduced. This reduces the required size of the assembly, and the corresponding attention to obstacle avoidance by the driver. In addition, where the signal mirror assembly includes a signal indicator parallel with a surface corresponding to that of the convex mirror, the indicator profile is less noticeable.

These and other objects, advantages, and features of the invention will be more fully understood and appreciated by reference to the description of the current embodiments and the drawings.

DETAILED DESCRIPTION OF THE INVENTION

Figure 1:
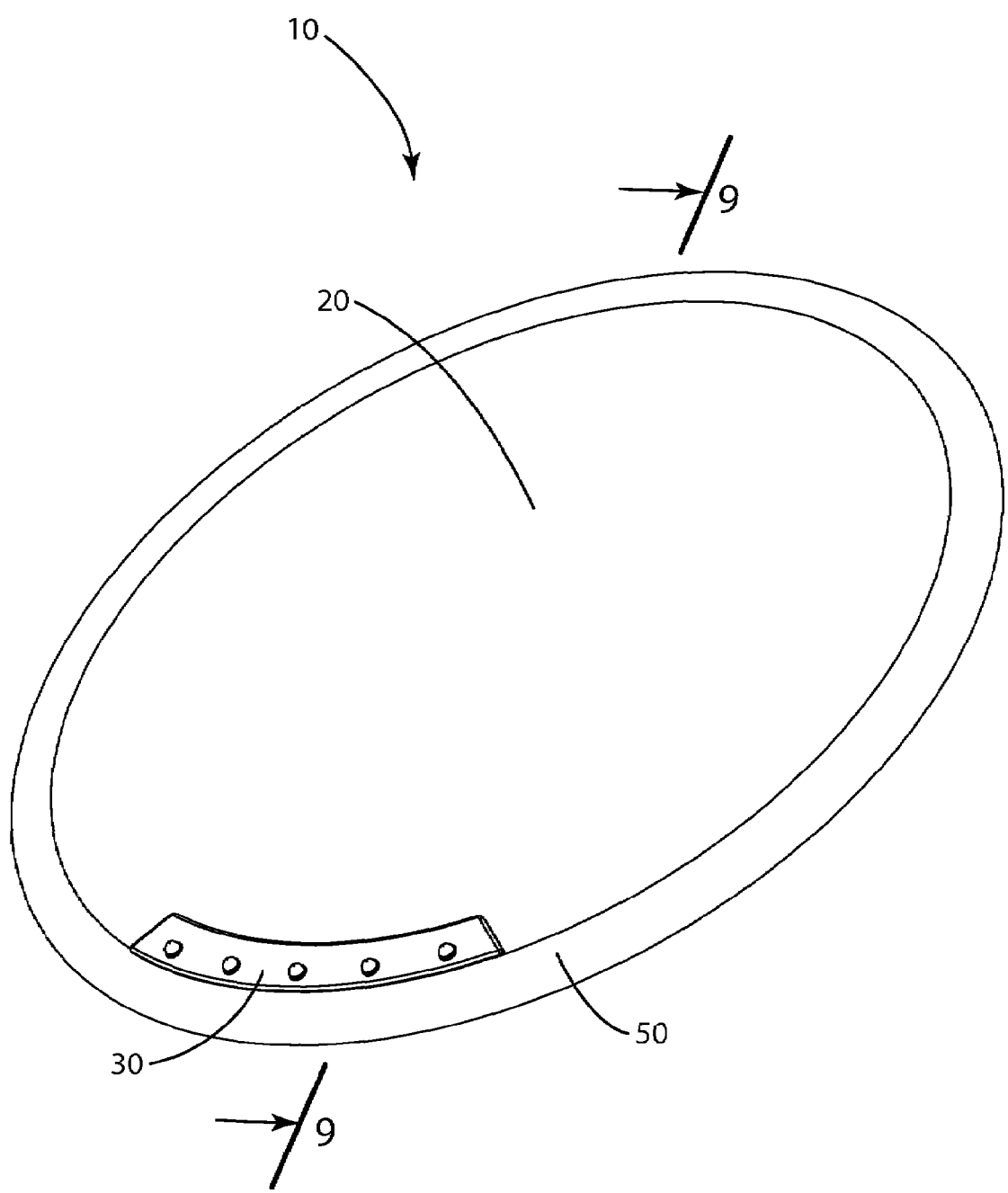
FIG. 1 is a perspective view of the signal mirror assembly of an embodiment of the invention.
Figure 2:
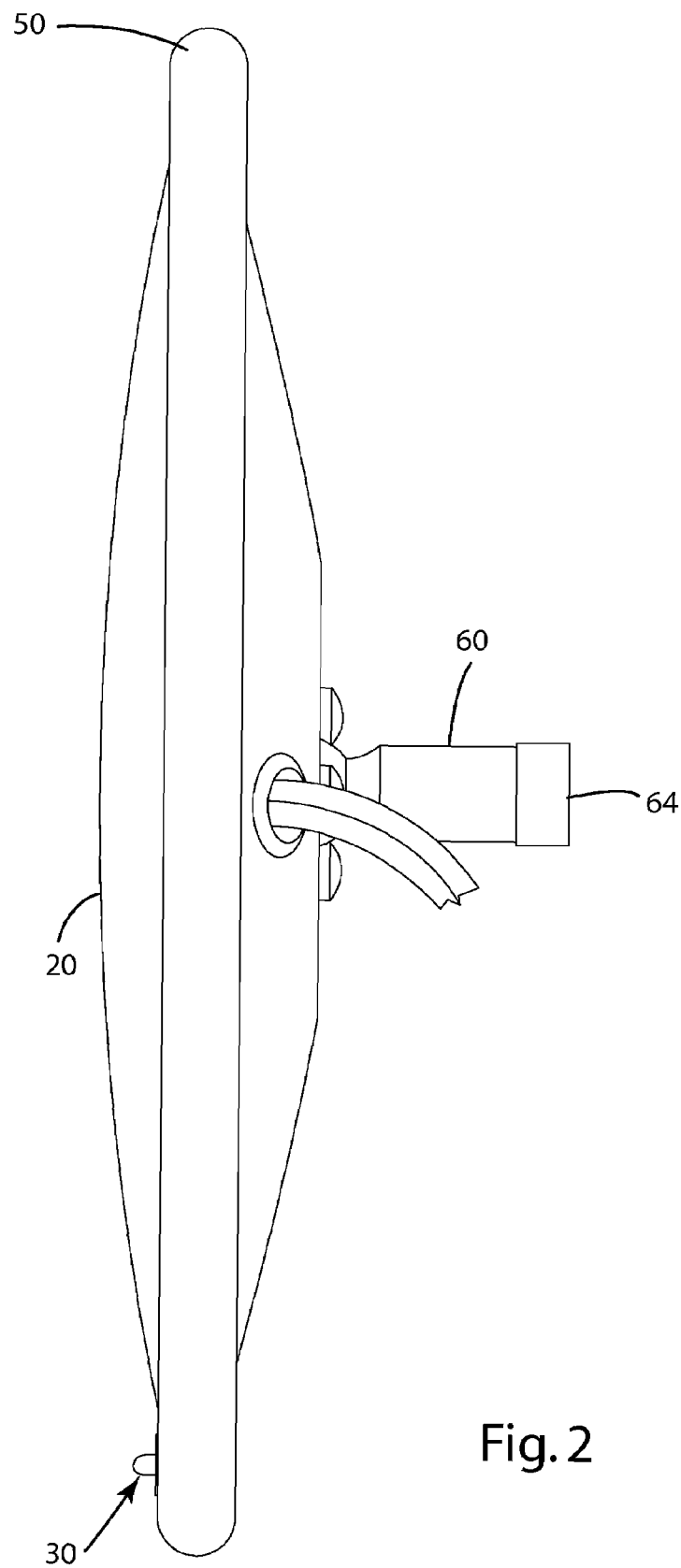
FIG. 2 is a right side view thereof.
Figure 3:
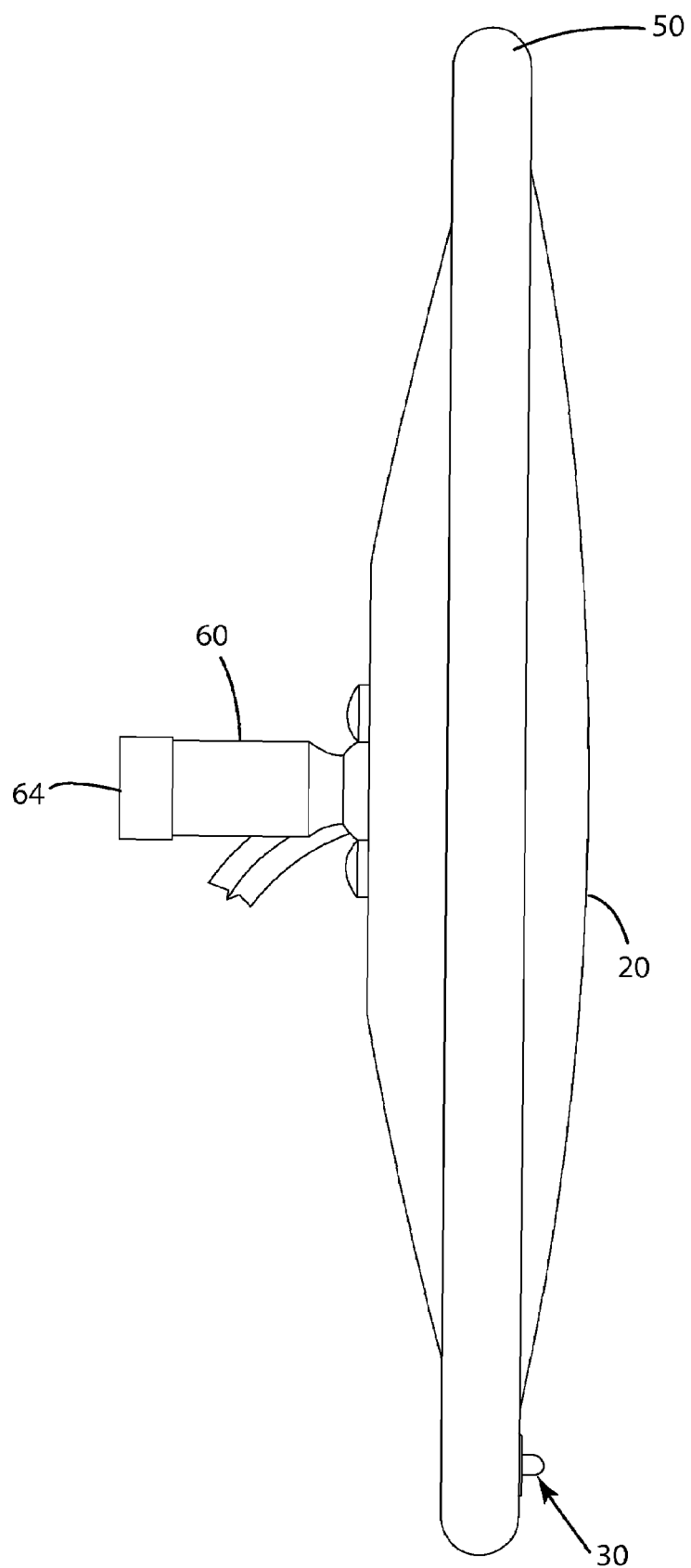
FIG. 3 is a left side view thereof.
Figure 4:
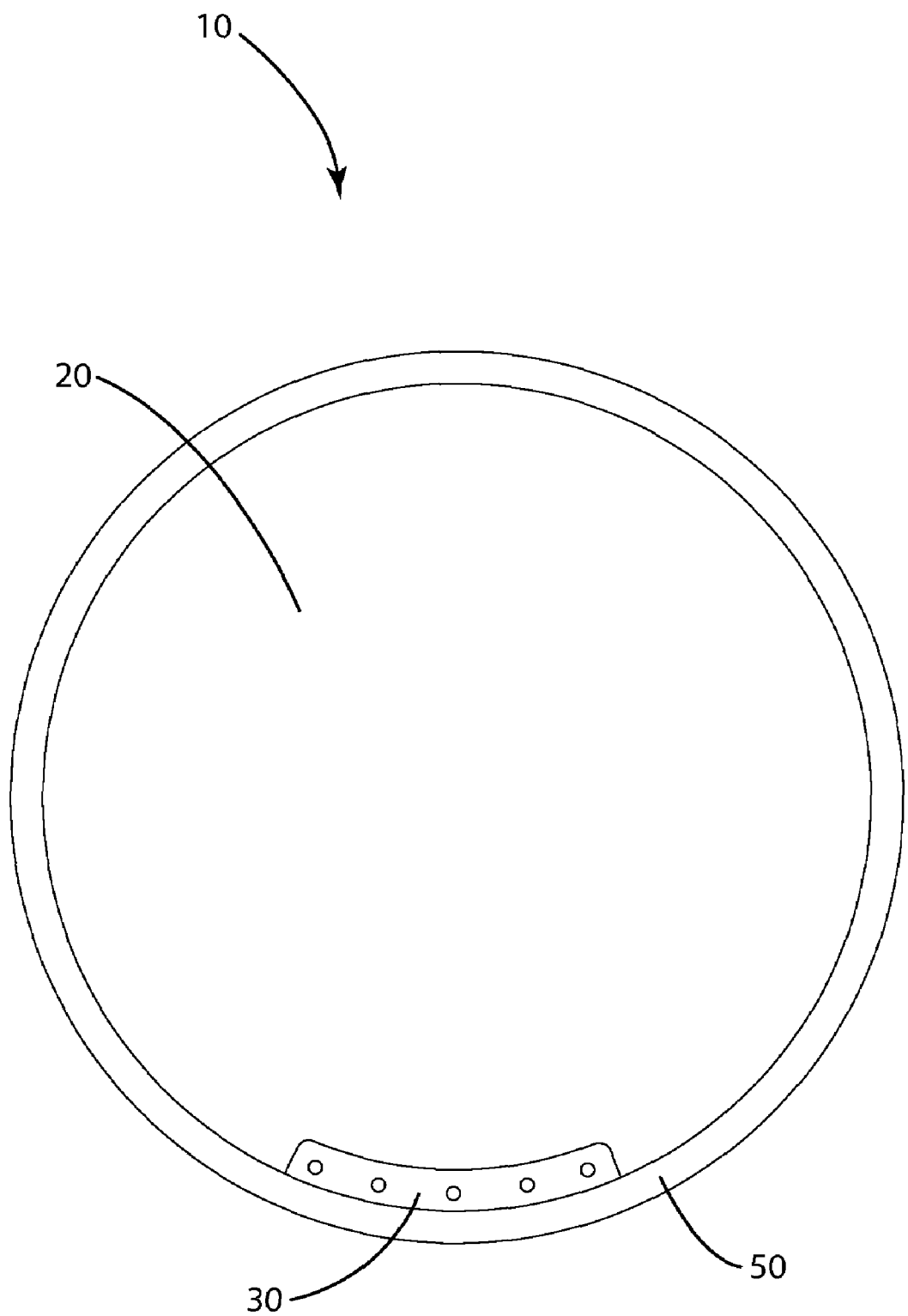
FIG. 4 Is a front view thereof.

A signal mirror assembly constructed in accordance with an embodiment of the invention is illustrated in FIGS. 1-9 and generally designated 10. The assembly 10 includes a mirror 20, a signal indicator 30, a housing 40, a gasket 50 and a support 60. The signal indicator is coupled with wiring 39 to signal circuitry of the vehicle 100. For purposes of this disclosure, the signal mirror assembly is described in connection with its use on a heavy duty truck, however, the assembly is well suited for use with any vehicle, equipment, or movable machine that requires occasional monitoring of a field behind or beside the machine.

The mirror 20 includes a front reflective surface, defined to form a generally convex surface, a rear surface, and a perimeter 22. The mirror 20 defines a recess or cut-out region 23 that interrupts the perimeter 22. As shown, the perimeter interruption includes a first edge 24 that projects generally inward from the perimeter 22 a first distance toward a central region 21 of the mirror. The edge 24 intersects a second edge 25 a pre-selected distance inward from the perimeter. This second edge 25 is generally in the shape of an arc of a circle or other shape concentric to the perimeter 22 of the mirror, and extends a second distance. Notably, the second edge can be any other shape as desired, or can be excluded from the design. The second edge intersects a third edge 26, which projects generally outward from the central region 21 to the perimeter 22 a third distance. The first, second and third distances may be selected to accommodate a signal indicator of a given dimensions as desired. Optionally, any of the edges may be eliminated, or additional edges may be added, to provide a cutout in a desired configuration. Alternatively, the edges may be combined to form a continuous curved edge.

The cutout region 23 of the mirror can be distal to an exterior side of the vehicle. With this positioning of the signal indicator, the activation of the signal will alert a driver of the vehicle when the signal is activated, but generally will not blind the driver with the signaling.

The mirror 20 is shown as being of a generally circular shape, however, it may be configured in a variety of other shapes, for example, elliptical, rectangular, square, trapezoidal and other shapes as desired. In addition, although the mirror is referred to as being a convex mirror, it is noted that this term can encompass any mirror that is not flat and/or provides wide angle viewing.

The signal indicator 30, which can be a modular indicator light, a signal lamp, and/or an area lamp, includes one or more lights 32 and a signal housing 34. Although the lights 32 as shown are LEDs, other lights, such as incandescent bulbs and cold cathode light emitters may be used. The LED lights 32 shown are attached to a circuit board 33 shown in FIG. 4. Wires 35 are in electrical communication with the circuit board 33. These wires are fed via any acceptable path to an electrical system of the vehicle 100, which is conventional, and therefore will not be described in detail here. The lights 32 may be activated in response to a vehicle operator's activation of a turn signal mechanism. Optionally, the signal indicator lights 32 of the mirror assembly flash to signal to an observer outside the vehicle of intended movement of the vehicle in the direction of the flashing light, for example, to indicate that the vehicle driver intends to turn or change lanes. The flashing of the mirror assembly signal indicator can be synchronized so that it flashes with a front and rear turn signal indicator on the vehicle 100. The lights 32 included in the mirror assembly 10 may be alternatively connected to indicate other functions of the vehicle, for example, braking or vehicle back-up.

The lights 32 can be configured to emit one or more of a variety of colors, depending on user preference and local governmental regulations. When the mirror assembly signal indicator is a dedicated turn signal, the lights 32 can emit red light. When the mirror assembly signal indicator serves an informational function such as an indication of braking or backing, the lights pan emit white, yellow, orange or red light, or combinations of these as desired.

The signal housing 34 is transparent or translucent and is configured to shelter the lights 32 from the elements. In general, the housing is configured in the same shape as the cut-out region 23, butts dimensioned slightly smaller than the region so that it nests neatly within the region. The housing can include a flange 36 which projects outward from the body 38 of the housing. This flange can be sized so that when the housing fits within the cut out region, the flange projects outward, over a portion of the reflective surface of the convex mirror (shown in broken lines in FIG. 8). Optionally, the flange can include a radiused edge 37 to provide a smooth transition from the mirror surface to the housing outer surface 39. In addition, this housing outer surface 39 can be configured so that it is generally parallel to the surface of the convex mirror reflective surface. Optionally, the flange can be absent from the housing, in which case the housing outer surface 39 can be parallel to and generally continue the convex mirror reflective surface. Further optionally, the signal housing 34 can include focusing elements, such as cube corners or other light reflective structures or reflective coatings therein, to enhance the lighting capabilities of the signal indicator 30.

The signal indicator 30 and convex mirror 20 can be joined with the housing 40 and/or spacers with an adhesive 45, which can be any suitable adhesive, for example, a urethane based adhesive. Other fasteners, such as bolts, screws and rivets can be used as desired. To space the mirror and/or signal indicator an appropriate distance from the housing if required, spacers 46 can be used. These spacers can be rubber spacers, or portions of double sided tape, which can also operate to hold the mirror in place as the adhesive (if used) sets.

The housing 40 shown is generally configured to be of the same shape as the mirror. The housing includes a ledge 43 and a flange 49 projecting upward therefrom. The flange 49 can be positioned and formed so that when the mirror perimeter 22 contacts the ledge 43 (and is Optionally adhered to the ledge), the perimeter is immediately adjacent the flange 49. As shown, the housing is an eight inch round housing, but other housings may be used as desired.

Figure 5:
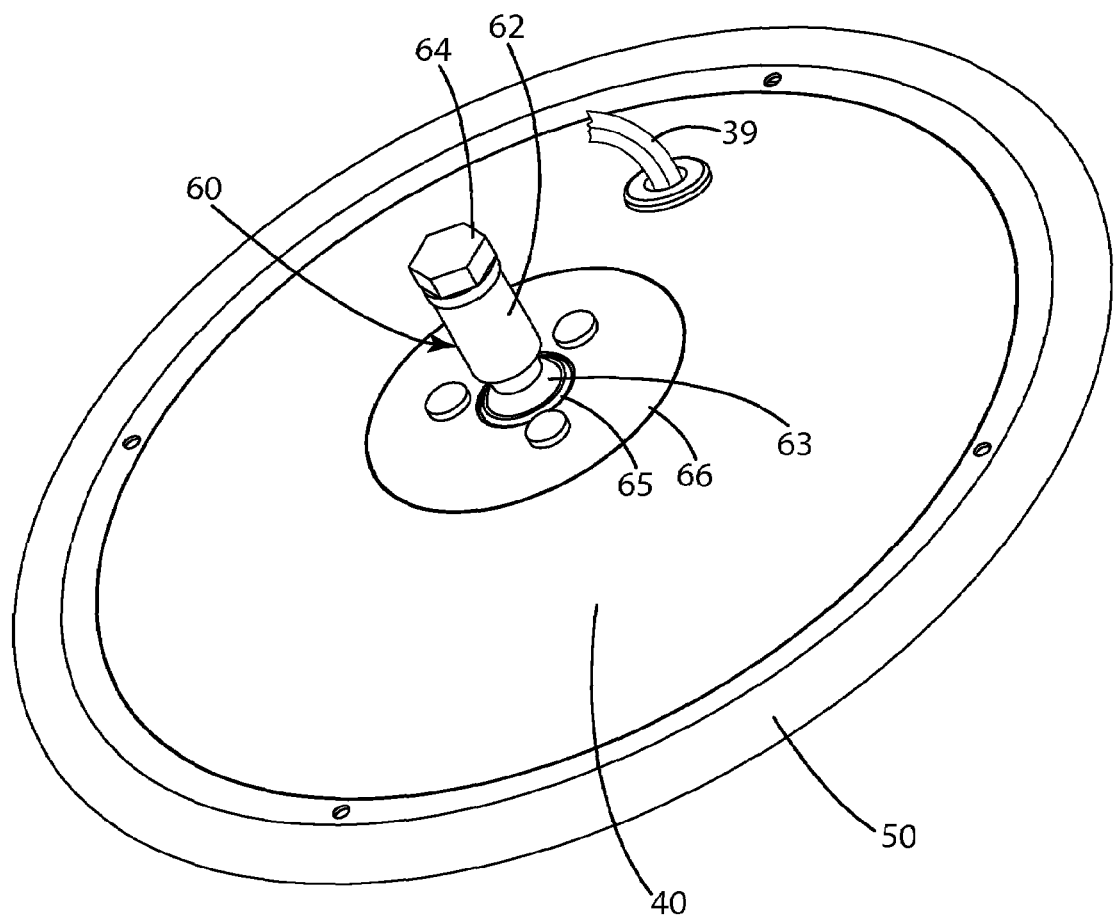
FIG. 5 is a rear view thereof.
Figure 6:
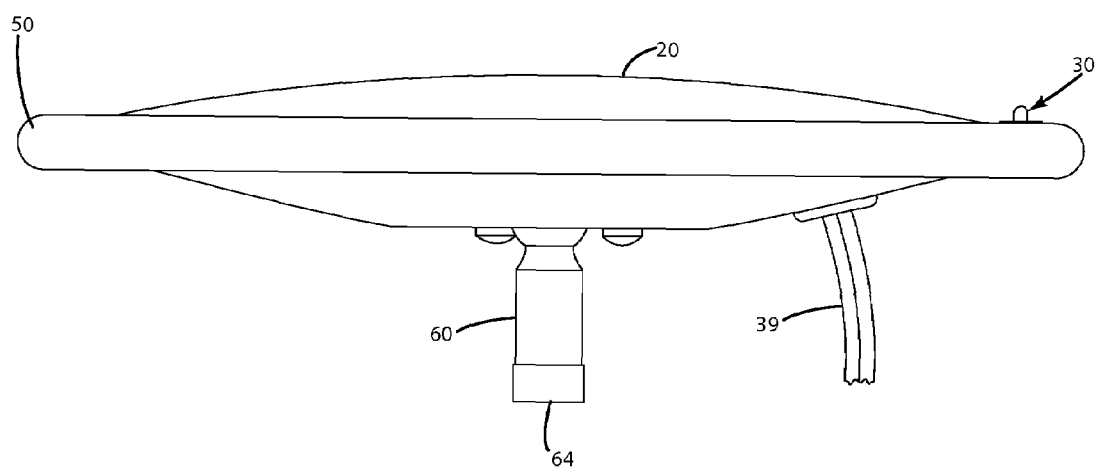
FIG. 6 is a top view thereof the bottom view being a mirror image thereof.
Figure 7:
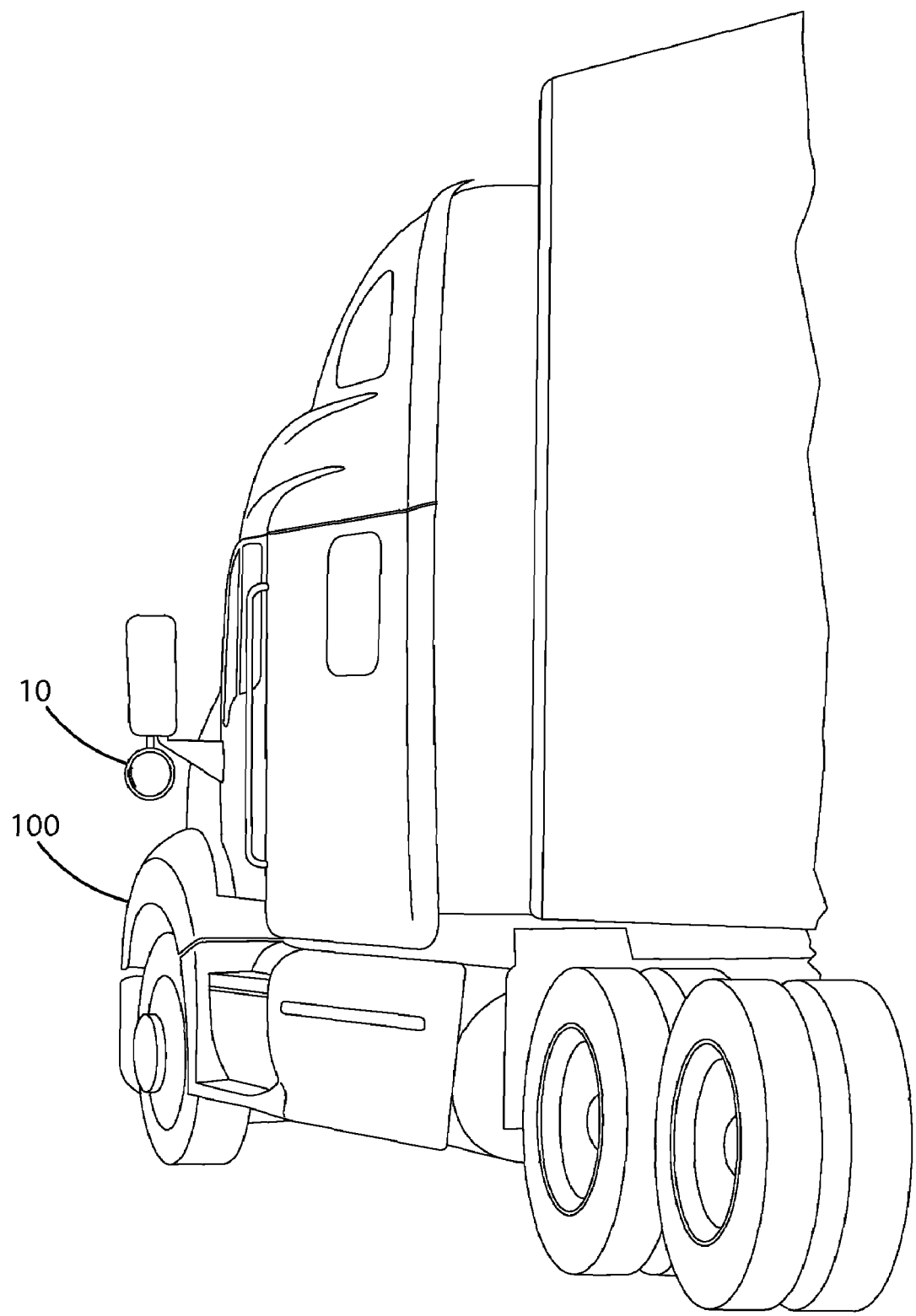
FIG. 7 is a perspective view of the signal mirror assembly installed on a truck.
Figure 8:
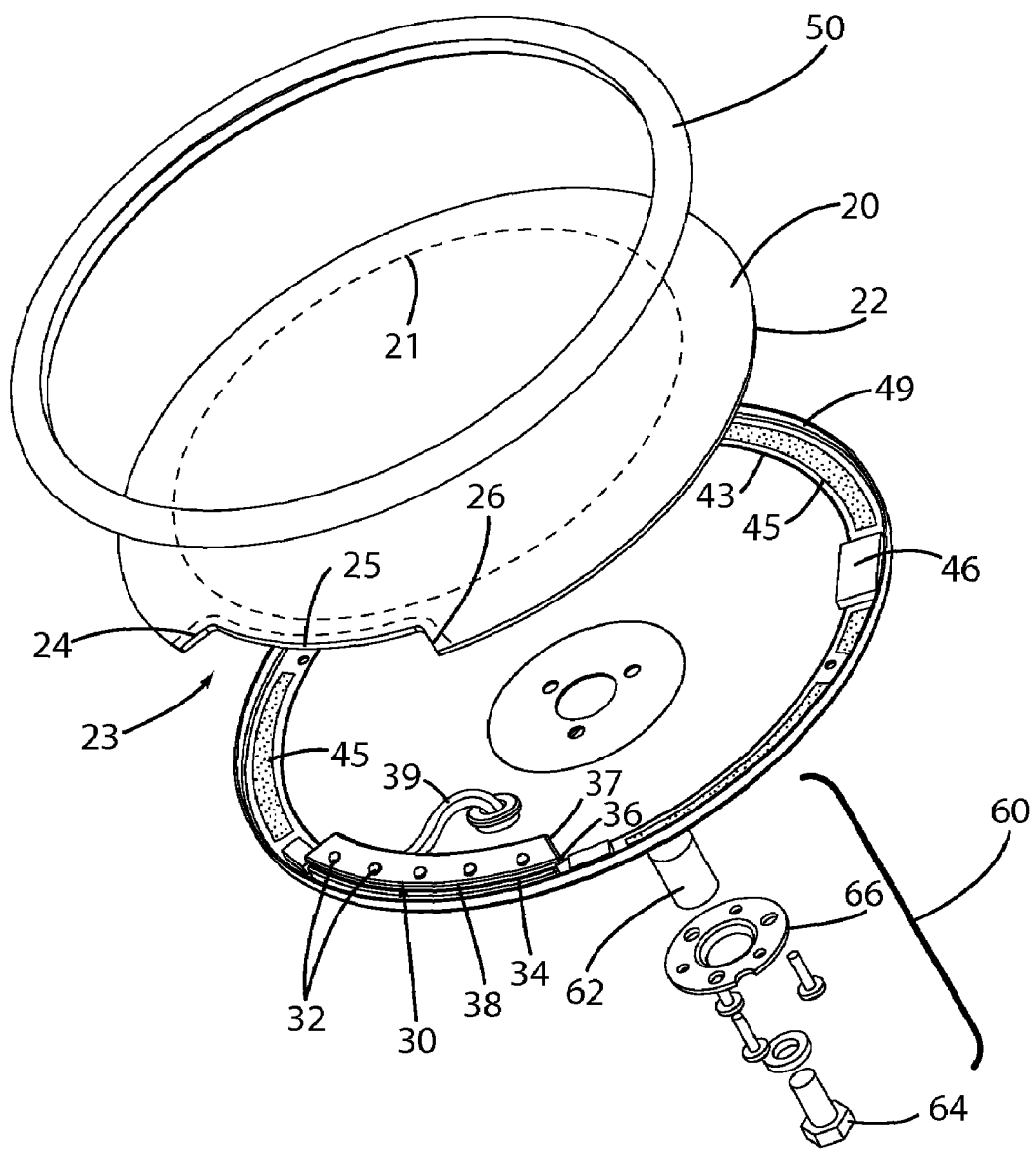
FIG. 8 is an exploded perspective: view of the signal mirror assembly.
Figure 9:
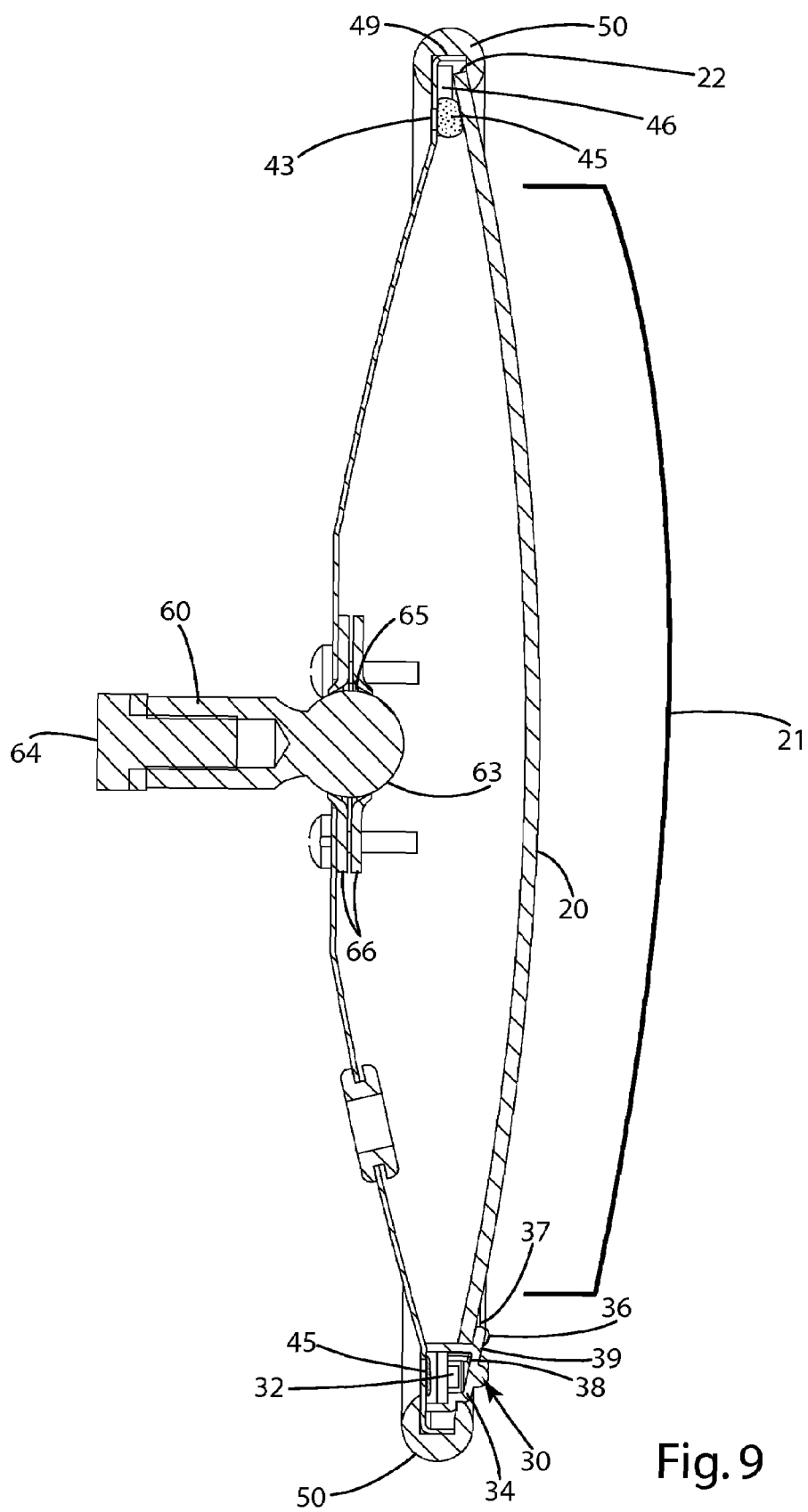
FIG. 9 is a sectional of the signal mirror assembly taken along line 9-9 in FIG. 1.

With reference to FIGS. 5, 8 and 9, the housing is joined to support 60. The support can be any structure that supports the housing. As shown, the support 60 includes a base 62 which is secured to a ball 63. The ball is caged in a ball joint 65 via plates 66, which are fastened to the housing. In this configuration, the support enables the housing to pivot relative to another structure on the vehicle. The bolt 64 of any other fasteners can be used to secure the support 60 to another vehicle structure. Other pivotable or non-pivotable joints as desired may be included in the support 60 to enable the user to adjust the mirror assembly to a preferred position.

To offer some protection to the components of the mirror assembly 10 from the elements, a gasket 50 is joined with the assembly 10. The gasket 50 shown circumferentiates and offers a seal around the outer edge of the housing 40, including the flange 49, and in some cases a portion of the ledge 43, as well as the perimeter 23 of the mirror 20. In addition, the gasket 50 can cover and seal a portion of the signal indicator 30, which is located in the cut-out region of the mirror. By "sealing," it is meant that the gasket engages a portion of a component significantly enough so as to prevent moisture, in gaseous or liquid form, and/or debris from readily passing between the interface of the gasket and the component. The gasket can be constructed of any suitable natural or synthetic material, for example, rubber, plastic or combinations of these materials.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. An exterior rearview mirror assembly for a vehicle comprising:
   a housing including an outer periphery;
   a mirror joined with the housing, the mirror including a convex reflective surface so that the mirror provides substantially only a wide angle viewing perspective to an occupant of the vehicle, the mirror including a first portion proximal to the vehicle, a second portion distal from the vehicle, and a central portion;
   a cut-out region defined by the mirror in the second region distal from the vehicle, the cut-out region bounded by at least one edge of the mirror that projects a distance inward and toward the central portion;
   a signal indicator located within and substantially filling the cut-out region defined by the mirror; and
   a gasket substantially surrounding the outer periphery of the housing, the gasket sealingly engaging at least a portion of the convex reflective surface and at least a portion of the signal indicator, whereby the gasket inhibits at least one of moisture and debris from entering the assembly.

2. The exterior rearview mirror assembly of claim 1 wherein the housing includes a ledge and a flange adjacent the ledge.

3. The exterior rearview mirror assembly of claim 2 wherein the convex mirror is adhered with an adhesive to the ledge.

4. The exterior rearview mirror assembly of claim 3 wherein the flange circumferentiates substantially all of an outer perimeter of the mirror.

5. The exterior rearview mirror assembly of claim 1 wherein the cutout region includes a first edge that projects toward the central region and a second edge that projects outward and away from the central portion.

6. The exterior rearview mirror assembly of claim 5 comprising an intermediate edge contiguous with the first edge and the second edge.

7. An exterior rearview mirror assembly for a vehicle comprising:
   a housing including a ledge and a peripheral flange, a spacer connected to the ledge;
   a mirror adhered to at least one of the ledge and the spacer, the mirror including a convex reflective surface so that the mirror provides substantially only a wide angle viewing perspective to an occupant of the vehicle, the mirror including a central portion, the mirror bounded by a perimeter, the perimeter adjacent and substantially circumferentiated by the flange;
   a recess defined by the mirror, a portion of the mirror perimeter within the recess projecting toward the central portion of the mirror;
   a signal indicator located within the recess defined by the mirror; and
   a gasket sealingly engaging at least a portion of the housing, at least a portion of the mirror perimeter and at least a portion of the signal indicator, whereby the gasket inhibits at least one of moisture and debris from entering the assembly.

8. The exterior rearview mirror assembly of claim 7 wherein the signal indicator includes an exterior surface that is adjacent the convex reflective surface and continues a contour of the convex reflective surface.

9. The exterior rearview mirror assembly of claim 7 wherein the mirror includes a first portion proximal to the vehicle and a second portion distal from the vehicle, and wherein the recess is defined by the mirror in substantially only the second region distal from the vehicle.

10. The exterior rearview mirror assembly of claim 7 wherein the signal indicator includes a flange, the flange overlapping a portion of the convex reflective surface.

11. The exterior rearview mirror assembly of claim 10 wherein the signal housing includes an outer surface that is parallel to the convex reflective surface.

12. The exterior rearview mirror assembly of claim 7 wherein the mirror perimeter is substantially circular, except for the recess.

13. The exterior rearview mirror assembly of claim 12 wherein the recess is arc-shaped.

14. The exterior rearview mirror assembly of claim 7 wherein the mirror perimeter includes a first portion located in the recess that projects toward the central region and a second portion located in the recess that extends away from the central region.

15. The exterior rearview mirror assembly of claim 14 wherein the mirror perimeter includes a third region located in the recess that extends between the first and second regions.

16. An exterior rearview mirror assembly for a vehicle comprising:
   a convex mirror that provides substantially only a wide angle viewing perspective to an occupant of the vehicle, the mirror including a substantially circular perimeter except for a cut-out region that interrupts the circular perimeter and that projects toward a central portion of the mirror, the cut-out region being distal from the vehicle; and
   a signal indicator located within and substantially filling the cut-out region defined by the mirror.

17. The exterior rearview mirror assembly of claim 16 wherein the signal indicator includes an exterior surface that is adjacent the convex mirror and includes a convex contour.

18. The exterior rearview mirror assembly of claim 16 comprising a housing which houses the convex mirror and the signal indicator, and a gasket that sealingly engages at least a portion of the housing, at least a portion of the convex mirror and at least a portion of the signal indicator, whereby the gasket inhibits at least one of moisture and debris from entering the assembly.

19. The exterior rearview mirror assembly of claim 16 wherein the signal indicator is translucent and includes at least one LED.

20. The exterior rearview mirror assembly of claim 16 wherein the cut-out region is substantially arc shaped and the signal indicator is substantially correspondingly arc-shaped so that it interfits the cut-out region.

* * * * *